US012767828B2

(12) United States Patent
Moudgil et al.

(10) Patent No.: US 12,767,828 B2
(45) Date of Patent: Oct. 20, 2026

(54) USE OF EPOXIDIZED OILS WITH ISOCYANATES AND OTHER RESINS FOR LIGNOCELLULOSIC COMPOSITES

(71) Applicant: HUBER ENGINEERED WOODS LLC, Charlotte, NC (US)

(72) Inventors: Karttikay Moudgil, Johns Creek, GA (US); Pascal Theberge, Jefferson, GA (US); Trevor Rajopa, Comer, GA (US); Terry Liles, Commerce, GA (US); William Kilmer, Lexington, NC (US); Timothy Romans, Jefferson, GA (US)

(73) Assignee: HUBER ENGINEERED WOODS LLC, Charlotte, NC (US)

( * ) Notice: Subject to any disclaimer, the term of this patent is extended or adjusted under 35 U.S.C. 154(b) by 724 days.

(21) Appl. No.: 18/108,919

(22) Filed: Feb. 13, 2023

(65) Prior Publication Data

US 2024/0279476 A1 Aug. 22, 2024

(51) Int. Cl.
*C08L 97/02* (2006.01)
*E04C 2/24* (2006.01)

(52) U.S. Cl.
CPC ................ *C08L 97/02* (2013.01); *E04C 2/24* (2013.01); *C08L 2205/035* (2013.01)

(58) Field of Classification Search
None
See application file for complete search history.

(56) References Cited

U.S. PATENT DOCUMENTS 4,772,442 A * 9/1988 Trout .................. C08G 18/281 264/300
7,553,549 B2 * 6/2009 Liles ......................... B32B 7/03 428/536
2012/0214012 A1 * 8/2012 Briner ..................... C08L 91/06 524/509
2023/0405867 A1 12/2023 Ni

* cited by examiner

*Primary Examiner* — Randy P Gulakowsk
*Assistant Examiner* — Holley Grace Hester
(74) *Attorney, Agent, or Firm* — Meunier Carlin & Curfman LLC

(57) ABSTRACT

The present disclosure provides for a lignocellulosic composite comprising an epoxidized plant-based oil, a lignocellulosic material, and an isocyanate resin. Also provided herein is a method of making a lignocellulosic composite, comprising combining an epoxidized plant-based oil, a lignocellulosic material, and an isocyanate resin. The present disclosure further provides for a lignocellulosic article comprising the lignocellulosic composite as disclosed herein.

22 Claims, 8 Drawing Sheets

A

B

A

B

A

B

A

B

USE OF EPOXIDIZED OILS WITH ISOCYANATES AND OTHER RESINS FOR LIGNOCELLULOSIC COMPOSITES

BACKGROUND

Isocyanate based resins are popular resins used in lignocellulosic composites as it contributes to the moisture resistance, durability, and strength of lignocellulosic composites. Therefore, in high quality products, isocyanates can often be used in a high quantity and volume, while in low grade commodity products, isocyanates can be used at a lower loading as well. While isocyanates improve the properties of lignocellulosic composites, their use have some downsides, some of which include increased costs, negative health effects from exposure, and the fact that isocyanates are petroleum-based products. Further, the continued use of high levels of isocyanates makes it more difficult to improve the sustainability of lignocellulosic composites and the methods of making thereof. Therefore, there is a need to reduce the amount of isocyanate used in lignocellulosic composites without negatively impacting the properties that isocyanates provide. The compositions and methods disclosed herein address these and other needs.

SUMMARY

In accordance with the purposes of the disclosed subject matter, as embodied and broadly described herein, the disclosed subject matter, in one aspect, relates to compositions and methods of making and using said compositions. In a further example, the disclosed subject matter relates to a lignocellulosic composite, a method of making thereof, and a lignocellulosic article comprising thereof.

Thus, in one example, a lignocellulosic composite is provided, including an epoxidized plant-based oil, a lignocellulosic material, and isocyanate resin.

In a further example, a method of making a lignocellulosic composite is provided, including combining an epoxidized plant-based oil, a lignocellulosic material, and an isocyanate resin.

Additionally, a lignocellulosic article is provided, including the lignocellulosic composite as disclosed herein.

Additional advantages will be set forth in part in the description that follows, and in part will be obvious from the description, or may be learned by practice of the examples described below. The advantages described below will be realized and attained by means of the elements and combinations particularly pointed out in the appended claims. It is to be understood that both the foregoing summary and the following detailed description are exemplary and explanatory only and are not restrictive.

BRIEF DESCRIPTION OF THE DRAWINGS

The accompanying figures, which are incorporated in and constitute a part of this specification, illustrate several aspects of the disclosure, and together with the description, serve to explain the principles of the disclosure.

DETAILED DESCRIPTION

Figure 1:
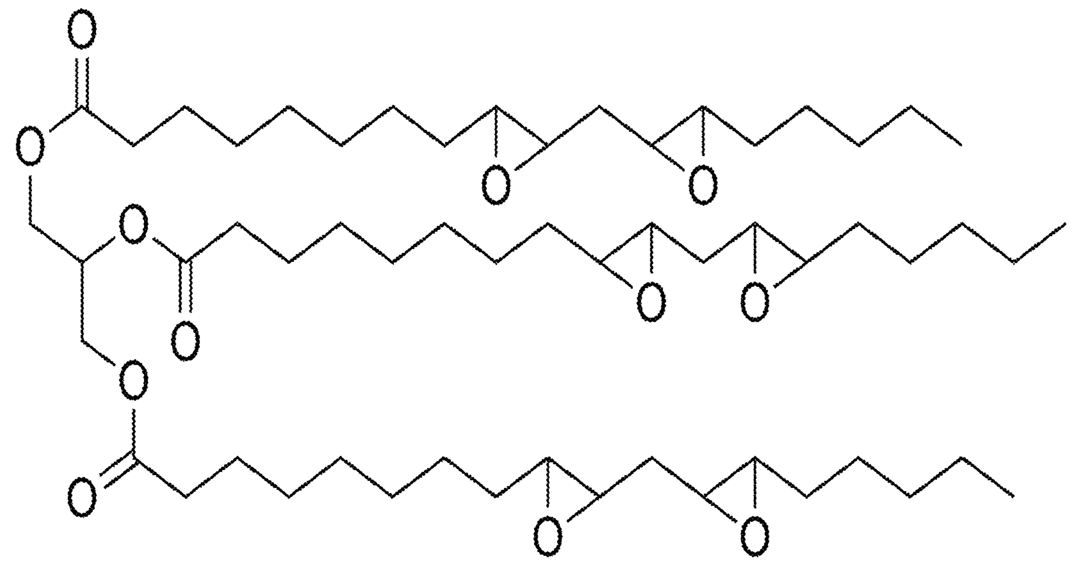
FIG. 1 is the chemical structure of an exemplary epoxidized soybean oil (ESO).

The following description of the disclosure is provided as an enabling teaching of the disclosure in its best, currently known embodiments. Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

As can be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It can be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

In this specification and in the claims that follow, reference will be made to a number of terms, which shall be defined to have the following meanings.

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of."

As used in the specification and the appended claims, the singular forms "a," "an" and "the" include plural referents unless the context clearly dictates otherwise. Thus, for example, reference to "a compound", includes, but is not limited to, one or more such compounds. Reference to "an adhesive" includes, but is not limited to, more than one such adhesive, and the like.

It should be noted that ratios, concentrations, amounts, and other numerical data can be expressed herein in a range format. It can be further understood that the endpoints of each of the ranges are significant both in relation to the other endpoint, and independently of the other endpoint.

All parts, percentages, and ratios used herein are expressed by weight unless otherwise specified. Further, all percentages and ratios correspond to the lignocellulosic composite prior to heat and/or pressure treatment that may cause a reaction between the contents of the lignocellulosic composite, unless otherwise specified.

Chemical Definitions

Unless otherwise defined, all technical and scientific terms used herein have the same meaning as commonly understood by one of ordinary skill in the art to which this invention belongs.

The organic moieties mentioned when defining variable positions within the general formulae described herein (e.g., the term "halogen") are collective terms for the individual substituents encompassed by the organic moiety. The prefix Cn-Cm preceding a group or moiety indicates, in each case, the possible number of carbon atoms in the group or moiety that follows.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valencies of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

"$Z^1$," "$Z^2$," "$Z^3$," and "$Z^4$" are used herein as generic symbols to represent various specific substituents. These symbols can be any substituent, not limited to those disclosed herein, and when they are defined to be certain substituents in one instance, they can, in another instance, be defined as some other substituents.

As used herein, the term "alkyl" refers to saturated, straight-chained or branched saturated hydrocarbon moieties. Unless otherwise specified, $C_1$-$C_{24}$ (e.g., $C_1$-$C_{22}$, $C_1$-$C_{20}$, $C_1$-$C_{18}$, $C_1$-$C_{16}$, $C_1$-$C_{14}$, $C_1$-$C_{12}$, $C_1$-$C_{10}$, $C_1$-$C_8$, $C_1$-$C_6$, or $C_1$-$C_4$) alkyl groups are intended. Examples of alkyl groups include methyl, ethyl, propyl, 1-methyl-ethyl, butyl, 1-methyl-propyl, 2-methyl-propyl, 1,1-dimethyl-ethyl, pentyl, 1-methyl-butyl, 2-methyl-butyl, 3-methyl-butyl, 2,2-dimethyl-propyl, 1-ethyl-propyl, hexyl, 1,1-dimethyl-propyl, 1,2-dimethyl-propyl, 1-methyl-pentyl, 2-methyl-pentyl, 3-methyl-pentyl, 4-methyl-pentyl, 1,1-dimethyl-butyl, 1,2-dimethyl-butyl, 1,3-dimethyl-butyl, 2,2-dimethyl-butyl, 2,3-dimethyl-butyl, 3,3-dimethyl-butyl, 1-ethyl-butyl, 2-ethyl-butyl, 1,1,2-trimethyl-propyl, 1,2,2-trimethyl-propyl, 1-ethyl-1-methyl-propyl, 1-ethyl-2-methyl-propyl, heptyl, octyl, nonyl, decyl, dodecyl, tetradecyl, hexadecyl, eicosyl, tetracosyl, and the like. Alkyl substituents may be unsubstituted or substituted with one or more chemical moieties. The alkyl group can be substituted with one or more groups including, but not limited to, hydroxyl, halogen, acetal, acyl, alkyl, alkoxy, alkenyl, alkynyl, aryl, heteroaryl, aldehyde, amino, cyano, carboxylic acid, ester, ether, carbonate ester, carbamate ester, ketone, nitro, phosphonyl, silyl, sulfo-oxo, sulfonyl, sulfone, sulfoxide, or thiol, as described below, provided that the substituents are sterically compatible and the rules of chemical bonding and strain energy are satisfied.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" or "haloalkyl" specifically refers to an alkyl group that is substituted with one or more halides (halogens; e.g., fluorine, chlorine, bromine, or iodine). The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

As used herein, the term "alkenyl" refers to unsaturated, straight-chained, or branched hydrocarbon moieties containing a double bond. Unless otherwise specified, $C_2$-$C_{24}$ (e.g., $C_2$-$C_{22}$, $C_2$-$C_{20}$, $C_2$-$C_{18}$, $C_2$-$C_{16}$, $C_2$-$C_{14}$, $C_2$-$C_{12}$, $C_2$-$C_{10}$, $C_2$-$C_5$, $C_2$-$C_6$, or $C_2$-$C_4$) alkenyl groups are intended. Alkenyl groups may contain more than one unsaturated bond. Examples include ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl, 2-methyl-2-propenyl, 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl, and 1-ethyl-2-methyl-2-propenyl. The term "vinyl" refers to a group having the structure $—CH═CH_2$; 1-propenyl refers to a group with the structure $—CH═CH—CH_3$; and 2-propenyl refers to a group with the structure $—CH_2—CH═CH_2$. Asymmetric structures such as $(Z^1Z^2)C═C(Z^3Z^4)$ are intended to include both the E and Z isomers. This can be presumed in structural formulae herein wherein an asymmetric alkene is present, or it can be explicitly indicated by the bond symbol C═C. Alkenyl substituents may be unsubstituted or substituted with one or more chemical moieties. Examples of suitable substituents include, for example, alkyl, alkoxy, alkenyl, alkynyl, aryl, heteroaryl, acetal, acyl, aldehyde, amino, cyano, carboxylic acid, ester, ether, carbonate ester, carbamate ester, halide, hydroxyl, ketone, nitro, phosphonyl, silyl, sulfo-oxo, sulfonyl, sulfone, sulfoxide, or thiol, as described below, provided that the substituents are sterically compatible and the rules of chemical bonding and strain energy are satisfied.

As used herein, the term "alkynyl" represents straight-chained or branched hydrocarbon moieties containing a triple bond. Unless otherwise specified, $C_2$-$C_{24}$ (e.g., $C_2$-$C_{24}$, $C_2$-$C_{20}$, $C_2$-$C_{18}$, $C_2$-$C_{16}$, $C_2$-$C_{14}$, $C_2$-$C_{12}$, $C_2$-$C_{10}$, $C_2$-$C_5$, $C_2$-$C_6$, or $C_2$-$C_4$) alkynyl groups are intended. Alkynyl groups may contain more than one unsaturated bond. Examples include $C_2$-$C_6$-alkynyl, such as ethynyl, 1-propynyl, 2-propynyl (or propargyl), 1-butynyl, 2-butynyl, 3-butynyl, 1-methyl-2-propynyl, 1-pentynyl, 2-pentynyl, 3-pentynyl, 4-pentynyl, 3-methyl-1-butynyl, 1-methyl-2-butynyl, 1-methyl-3-butynyl, 2-methyl-3-butynyl, 1,1-dimethyl-2-propynyl, 1-ethyl-2-propynyl, 1-hexynyl, 2-hexynyl, 3-hexynyl, 4-hexynyl, 5-hexynyl, 3-methyl-1-pentynyl, 4-methyl-1-pentynyl, 1-methyl-2-pentynyl, 4-methyl-2-pentynyl, 1-methyl-3-pentynyl, 2-methyl-3-pentynyl, 1-methyl-4-pentynyl, 2-methyl-4-pentynyl, 3-methyl-4-pentynyl, 1,1-dimethyl-2-butynyl, 1,1-dimethyl-3-butynyl, 1,2-dimethyl-3-butynyl, 2,2-dimethyl-3-butynyl, 3,3-dimethyl-1-butynyl, 1-ethyl-2-butynyl, 1-ethyl-3-butynyl, 2-ethyl-3-butynyl, and 1-ethyl-1-methyl-2-propynyl. Alkynyl substituents may be unsubstituted or substituted with one or more chemical moieties. Examples of suitable substituents include, for example, alkyl, alkoxy, alkenyl, alkynyl, aryl, heteroaryl, acetal, acyl, aldehyde, amino, cyano, carboxylic acid, ester, ether, carbonate ester, carbamate ester, halide, hydroxyl, ketone, nitro, phosphonyl, silyl, sulfo-oxo, sulfonyl, sulfone, sulfoxide, or thiol, as described below.

As used herein, the term "aryl," as well as derivative terms such as aryloxy, refers to groups that include a monovalent aromatic carbocyclic group of from 3 to 50 carbon atoms. Aryl groups can include a single ring or multiple condensed rings. In some embodiments, aryl groups include $C_6$-$C_{10}$ aryl groups. Examples of aryl groups include, but are not limited to, benzene, phenyl, biphenyl, naphthyl, tetrahydronaphthyl, phenylcyclopropyl, phenoxybenzene, and indanyl. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. The term "non-heteroaryl," which is also included in the term "aryl," defines a group that contains an aromatic group that does not contain a heteroatom. The aryl substituents may be unsubstituted or substituted with one or more chemical moieties. Examples of suitable substituents include, for example, alkyl, alkoxy, alkenyl, alkynyl, aryl, heteroaryl, acetal, acyl, aldehyde, amino, cyano, carboxylic acid, ester, ether, carbonate ester, carbamate ester, halide, hydroxyl, ketone, nitro, phosphonyl, silyl, sulfo-oxo, sulfonyl, sulfone, sulfoxide, or thiol as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is substituted with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, alkoxy, alkenyl, alkynyl, aryl, heteroaryl, acetal, acyl, aldehyde, amino, cyano, carboxylic acid, ester, ether, carbonate ester, carbamate ester, halide, hydroxyl, ketone, nitro, phosphonyl, silyl, sulfo-oxo, sulfonyl, sulfone, sulfoxide, or thiol as described herein.

The term "cycloalkenyl" as used herein is a non-aromatic carbon-based ring composed of at least three carbon atoms and containing at least one double bound, i.e., C═C. Examples of cycloalkenyl groups include, but are not limited to, cyclopropenyl, cyclobutenyl, cyclopentenyl, cyclopentadienyl, cyclohexenyl, cyclohexadienyl, and the like. The term "heterocycloalkenyl" is a type of cycloalkenyl group as defined above and is included within the meaning of the term "cycloalkenyl," where at least one of the carbon atoms of the ring is substituted with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, acetal, acyl, aldehyde, amino, cyano, carboxylic acid, ester, ether, carbonate ester, carbamate ester, halide, hydroxyl, ketone, nitro, phosphonyl, silyl, sulfo-oxo, sulfonyl, sulfone, sulfoxide, or thiol as described herein.

The term "cyclic group" is used herein to refer to either aryl groups, non-aryl groups (i.e., cycloalkyl, heterocycloalkyl, cycloalkenyl, and heterocycloalkenyl groups), or both. Cyclic groups have one or more ring systems (e.g., monocyclic, bicyclic, tricyclic, polycyclic, etc.) that can be substituted or unsubstituted. A cyclic group can contain one or more aryl groups, one or more non-aryl groups, or one or more aryl groups and one or more non-aryl groups.

The term "cyano" as used herein is represented by the formula —CN.

The term "aldehyde" as used herein is represented by the formula —C(O)H. Throughout this specification "C(O)" is a shorthand notation for C═O.

The term "epoxy" or "epoxide" as used herein refers to a cyclic ether with a three-atom ring and can represented by Formula I:

Formula I

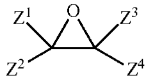

where $Z^1$, $Z^2$, $Z^3$, and $Z^4$ can be, independently, an alkyl, alkenyl, alkynyl, aryl, heteroaryl, cycloalkyl, cycloalkenyl, heterocycloalkyl, or heterocycloalkenyl group described above.

Unless stated to the contrary, a formula with chemical bonds shown only as solid lines and not as wedges or dashed lines contemplates each possible stereoisomer or mixture of stereoisomer (e.g., each enantiomer, each diastereomer, each meso compound, a racemic mixture, or scalemic mixture).

Lignocellulosic Composite

Epoxidized plant-based oils, such as epoxidized linseed oil or epoxidized soybean oil, e.g., as shown in FIG. 1, can be combined with an isocyanate, such as pMDI, to form a stable mixture that shows equivalent and even superior functional properties in lignocellulosic composites when compared to isocyanate resin without an epoxidized plant-based oil. In some examples, the epoxidized plant-based oils can be added to the pMDI, while in further examples the quantity of pMDI used in a lignocellulosic composite formulation can be reduced and replaced with the epoxidized plant-based oils. Adhesives such as phenyl formaldehyde resins (PF) can also be used with the epoxidized plant-based oils and isocyanate without negatively affecting the properties of the lignocellulosic composite.

Methods of combining epoxidized plant-based oils with an isocyanate can include, at least, in-line mixing wherein an isocyanate and epoxidized plant-based oil are fed into a mixing tube and added to a blender. Combining can also include mixing with a variety of blade types and at various speeds. The epoxidized plant-based oil and isocyanate are combined to form a homogenous mixture.

The present disclosure, in one aspect, provides for a lignocellulosic composite comprising an epoxidized plant-based oil, a lignocellulosic material, and an isocyanate resin.

The lignocellulosic composite can be suitable for use in residential and commercial building construction, as well as by industrial, and original equipment manufacturers (in products such as furniture, elevators, trucks, trailers, sheds, campers, RVs, and mobile homes). Lignocellulosic composites can include oriented strand board ("OSB"), waferboard, particle board, medium-density fiberboard, plywood, agfiber boards, strands and ply veneer composites, and agfiber and strand composites.

Oriented strand board (OSB) can be derived from a starting material that is naturally occurring hard or soft wood, singularly or mixed, whether such wood is dry (having a moisture content of from 2% to 12% by weight) or green (having a moisture content of from 30% to 200% by weight). In some examples, the raw wood starting materials can be either virgin or reclaimed, and can be cut into strands, wafers, or flakes of desired size and shape. OSB is formed by adding adhesives to lignocellulosic material and then the combination of adhesives and wood are compressed in specific orientations.

Waferboard is a structural material made from rectangular wood flakes of controlled length and thickness bonded together with waterproof phenolic resin under heat and pressure. Unlike oriented strand board, the wood flakes in waferboard are not in a particular orientation.

Particle board, also referred to as chipboard, is an engineered wood product manufactured from wood chips and a synthetic resin or binder, which is then pressed and extruded. Particle board is cheaper, denser, and more uniform than conventional wood and plywood and can be substituted for those products.

Medium-density fiberboard can be made from combining wax and an adhesive binder with fibrous wood or lignocellulosic materials and forming it into boards by applying high temperature and pressure.

Plywood is made from thin layers of wood or lignocellulosic composite that are glued together with adjacent layers having their wood grain rotated up to 90 degrees in comparison to each other.

Agfiber board, also referred to as agricultural fiber board, is a board made of agricultural products, such as wheat straw or rice. These agfiber boards can replace particleboard, as well as other boards made from wood or lignocellulosic composites.

Epoxidized Plant-Based Oil

Epoxidation is a chemical reaction that converts a carbon-carbon double bond into epoxides, using reagents that include but are not limited to air oxidation, hypochlorous acid, hydrogen peroxide, and organic peracid. Epoxidized plant-based oils can be a product of the epoxidation chemical reaction. Epoxidized soybean oil and epoxidized linseed oil are examples of epoxidized plant-based oils that can result from epoxidation. Various epoxidized plant oils are conventional and known in the art and can be purchased from various suppliers.

In certain examples, the lignocellulosic composite comprises from greater than 0% to 5% by weight of epoxidized plant-based oil.

In some examples, the lignocellulosic composite comprises from greater than 0% to 2.5% by weight of epoxidized plant-based oil. In further examples, the lignocellulosic composite comprises from 1% to 3% by weight of epoxidized plant-based oil. In some examples, the lignocellulosic composite comprises from greater than 0% to 2%, 2% to 4%, 4% to 5%, 0.5% to 1%, or 1% to 4% by weight of epoxidized plant-based oil. In further examples, the lignocellulosic composite comprises from 0% to 0.5%, 0.5% to 1%, 1% to 1.5%, 1.5% to 2.0%, 2.0% to 2.5%, 2.5% to 3.0%, 3.0% to 3.5%, 3.5% to 4.0%, 4.0% to 4.5%, or 4.5% to 5.0% by weight of epoxidized plant-based oil.

In some examples, the lignocellulosic composite comprises from 1.4% to 1.6% by weight of epoxidized plant-based oil. In further examples, the lignocellulosic composite comprises from 1.4% to 1.45%, 1.45% to 1.5%, 1.5% to 1.55%, or 1.55% to 1.6% by weight of epoxidized plant-based oil. In certain examples, the lignocellulosic composite comprises from 1.4% to 1.5%, 1.4% to 1.55%, or 1.4% to 1.6% by weight of epoxidized plant-based oil.

If epoxidized linseed oil is used, it can be used in the same amounts as disclosed herein for ESO.

In some examples, the epoxidized plant-based oil comprises an epoxidized soybean oil, an epoxidized linseed oil, or a combination thereof.

Epoxidized linseed oil is the product of epoxidizing linseed oil. Linseed oil, also referred to as flaxseed oil or flax oil, is a colorless to yellowish oil obtained from the dried, ripened seeds of the flax plant. The oil can be obtained by pressing flax seed and in some examples, can be followed by solvent extraction.

Epoxidized soybean oil (ESO) can result from the oxidation of soybean oil with hydrogen peroxide and either acetic or formic acid. The chemical structure of an example of ESO can be found in FIG. 1.

Lignocellulosic Material

Lignocellulosic material can include any lignocellulosic biomass, which includes but is not limited to wood, bamboo, straw, plant waste, or any combination thereof.

In some examples, the wood can include a hardwood, a softwood, or any combination thereof. Wood includes cellular structure having cell walls comprising cellulose and hemicellulose fibers bonded together by lignin polymer. Wood can include natural woods such as pine, redwood, cedar, cypress, Douglas fir, mahogany, such as African mahogany, Ipe, oak, maple, cherry, walnut, ash, or any combination thereof.

In further examples, the lignocellulosic material can be a powder, a pulp, a board, a veneer, a flake, a chip, or any combination thereof. As used herein, "flakes", "strands", and "wafers" are considered equivalent to one another and are used interchangeably.

The lignocellulosic composites can comprise from 99% to 90% by weight lignocellulosic material. For example, the lignocellulosic composites can comprise from 90% to 91%, 91% to 92%, 92% to 93%, 93% to 94%, 94% to 95%, 95% to 96%, 96% to 97%, 97% to 98%, or 98% to 99% by weight of lignocellulosic material. In other examples, the lignocellulosic composites can comprise from 90% to 92%, 92% to 94%, 94% to 96%, 96% to 98% by weight of lignocellulosic material. In other examples, the lignocellulosic composites can comprise from 90% to 93%, 93% to 96%, 96% to 99% by weight of lignocellulosic material.

Isocyanate Resin

In some examples, the isocyanate resin comprises methylenebis(phenyl isocyanate) (MDI), polymeric methylene diphenyl diisocyanate (pMDI), ethylenebis(phenyl isocyanate) (EDI), toluene diisocyanate (TDI), hexamethylene diisocyanate (HDI), naphthalene diisocyanate (NDI), methylene bis-cyclohexylisocyante (HMDI; hydrogenated MDI, isophorone diisocyanate (IPDI), or any combination thereof.

In some examples, resins can include other isocyanate or formaldehyde resins, or any combination thereof. In further examples, formaldehyde resins include phenol formaldehyde (PF) resin, melamine formaldehyde resin, or any combination thereof.

In some examples, the weight ratio of isocyanate resin to epoxidized plant-based oil is from 2:1 to 4:1. In further examples, the ratio of isocyanate resin to epoxidized plant-based oil can be from 2:1 to 2.5:1, 2.5:1 to 3:1, 3:1 to 3.5:1, or 3.5:1 to 4:1. In specific examples, the ratio of isocyanate resin to epoxidized plant-based oil can be from 2:1 to 3:1, or 2:1 to 3.5:1. In certain examples, the ratio of isocyanate resin to epoxidized plant-based oil can be from 2.5:1 to 4:1, 3:1 to 4:1, or 3.5:1 to 4:1. In some examples, the ratio of isocyanate resin to epoxidized plant-based oil can be from 2.0:1 to 2.25:1, 2.25:1 to 2.5:1, 2.5:1 to 2.75:1, 2.75:1 to 3.0:1, 3.0:1 to 3.25:1, 3.25:1 to 3.5:1, 3.5:1 to 3.75:1, or 3.75:1 to 4:1. In further examples, the ratio of isocyanate resin to epoxidized plant-based oil can be from 2.0:1 to 2.5:1, 2:1 to 2.75:1, 2:1 to 3.0:1, 2.0:1 to 3.25:1, 2.00:1 to 3.5:1, or 2.00:1 to 3.75:1.

In some examples, the lignocellulosic composite comprises from greater than 0% to 2.5% by weight of isocyanate resin. In further examples, the lignocellulosic composite comprises from 1% to 3% by weight of isocyanate resin. In some examples, the lignocellulosic composite comprises from greater than 0% to 2%, 2% to 4%, 4% to 5%, 0.5% to 1%, or 1% to 4% by weight of isocyanate resin. In further examples, the lignocellulosic composite comprises from 0% to 0.5%, 0.5% to 1%, 1% to 1.5%, 1.5% to 2.0%, 2.0% to 2.5%, 2.5% to 3.0%, 3.0% to 3.5%, 3.5% to 4.0%, 4.0% to 4.5%, or 4.5% to 5.0% by weight of isocyanate resin.

In some examples, the lignocellulosic composite comprises from 1.4% to 1.6% by weight of epoxidized plant-based oil. In further examples, the lignocellulosic composite comprises from 1.4% to 1.45%, 1.45% to 1.5%, 1.5% to 1.55%, or 1.55% to 1.6% by weight of isocyanate resin. In certain examples, the lignocellulosic composite comprises from 1.4% to 1.5%, 1.4% to 1.55%, or 1.4% to 1.6% by weight of isocyanate resin.

Polymeric Methylene Diphenyl Diisocyanate (pMDI)

In further examples, the isocyanate resin comprises polymeric methylene diphenyl diisocyanate (pMDI). Various isocyanate resins and adhesives for use in lignocellulosic composites are conventional and known in the art and can be purchased from various suppliers.

MDI further includes polymeric MDI (pMDI), which is a mixture that can include from 25% to 80% monomeric 4,4'-MDI as well as oligomers containing 3-6 rings and other minor isomers, such as the 2,2' isomer. The exact composition of pMDI varies with the manufacturer. pMDI can also be referred to as polymeric diphenylmethane diisocyanate or polymethylene polyphenylisocyanates. The chemical structure of an example pMDI is shown in Formula II.

Formula II

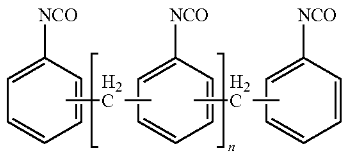

In some examples, the lignocellulosic composite can comprise from 3% to 5% by weight of pMDI. In further examples, the lignocellulosic composite can comprise from 1.5% to 2.5% by weight of pMDI.

In some examples, the lignocellulosic composite can comprise from 1.5% to 5% by weight of pMDI. In further examples, the lignocellulosic composite can comprise from 1.5% to 2%, 2% to 2.5%, 2.5% to 3%, 3% to 3.5%, 3.5% to 4%, 4% to 4.5%, or 4.5% to 5% by weight of pMDI. In certain examples, the lignocellulosic composite can comprise from 1.5% to 2.5%, 1.5% to 3%, 1.5% to 3.5%, 1.5% to 4%, 1.5% to 4.5%, or 1.5% to 5% by weight of pMDI. In specific examples, the lignocellulosic composite can comprise from 2% to 3%, 3% to 4%, or 4% to 5% by weight of pMDI.

In some examples, the lignocellulosic composite can comprise from 1.5% to 1.6%, 1.6% to 1.7%, 1.7% to 1.8%, 1.8% to 1.9%, or 1.9% to 2.0% by weight of pMDI. In further examples, the lignocellulosic composite can comprise from 1.5% to 1.7%, 1.5% to 1.8%, 1.5% to 1.9%, or 1.5% to 2.0% by weight of pMDI. In certain examples, the lignocellulosic composite can comprise from 2% to 2.1%, 2.1% to 2.2%, 2.2% to 2.3%, 2.3% to 2.4%, or 2.4% to 2.5% by weight of pMDI. In specific examples, the lignocellulosic composite can comprise from 2% to 2.2%, 2% to 2.3%, 2% to 2.4%, or 2% to 2.5% by weight of pMDI. In some examples, the lignocellulosic composite can comprise from 2.7% to 2.8%, 2.8% to 2.9%, 2.9% to 3.0%, 3.0% to 3.1%, or 3.1% to 3.2% by weight of pMDI. In further examples, the lignocellulosic composite can comprise from 2.7% to 2.9%, 2.7% to 3.0%, 2.7% to 3.1%, or 2.7% to 3.2% by weight of pMDI. In certain examples, the lignocellulosic composite can comprise from 3.5% to 3.6%, 3.6% to 3.7%, 3.7% to 3.8%, 3.8% to 3.9%, or 3.9% to 4% by weight of pMDI. In specific examples, the lignocellulosic composite can comprise from 3.5% to 3.7%, 3.5% to 3.8%, 3.5% to 3.9%, or 3.5% to 4% by weight of pMDI. In some examples, the lignocellulosic composite can comprise from 4.2% to 4.3%, 4.3% to 4.4%, 4.4% to 4.5%, 4.5% to 4.6%, or 4.6% to 4.7% by weight of pMDI. In further examples, the lignocellulosic composite can comprise from 4.2% to 4.4%, 4.2% to 4.5%, 4.2% to 4.6%, or 4.2% to 4.7% by weight of pMDI.

Wax

Wax can be used in the disclosed lignocellulosic composites, e.g., OSB, for water resistance and lubrication. It can help control water absorption in that it minimizes edge swelling in a lignocellulosic composite. Various waxes for use in lignocellulosic composites are conventional and known in the art and can be purchased from various suppliers.

In certain examples, the lignocellulosic composite can further comprise from 1% to 2% by weight of wax. In further examples, the lignocellulosic composite can comprise from 1% to 1.2%, 1.2% to 1.4%, 1.4% to 1.6%, 1.6% to 1.8%, or 1.8% to 2.0% by weight of wax. In certain examples, the lignocellulosic composite can comprise from 1% to 1.4%, 1% to 1.6%, 1% to 1.8%, or 1% to 2.0% by weight of wax. In specific examples, the lignocellulosic composite can comprise from 1.2% to 1.22%, 1.22% to 1.24%, 1.24% to 1.26%, 1.26% to 1.28%, or 1.28% to 1.30% by weight of wax. In some examples, the lignocellulosic composite can comprise from 1.20% to 1.24%, 1.20% to 1.26%, 1.20% to 1.28%, or 1.20% to 1.30% by weight of wax. In further examples, the lignocellulosic composite can comprise from 1.75% to 1.77%, 1.77% to 1.79%, 1.79% to 1.81%, 1.81% to 1.83%, or 1.83% to 1.85% by weight of wax. In certain examples, the lignocellulosic composite can comprise from 1.75% to 1.79%, 1.75% to 1.81%, 1.75% to 1.83%, or 1.75% to 1.85% by weight of wax.

Phenyl Formaldehyde (PF)

In some examples, the lignocellulosic composite can further comprise from 1% to 2% by weight of phenyl formaldehyde (PF). In further examples, the lignocellulosic composite can also comprise melamine formaldehyde resins (MF), melamine urea formaldehyde resins (MUF), or any combination thereof, for example. In specific examples, cross-linkers such as phenol melamine urea formaldehyde (PMUF) resin or phenol resorcinol formaldehyde (PRF) resins can be used to further improve properties of the lignocellulosic composite. Various formaldehyde resins for use in lignocellulosic composites are conventional and known in the art and can be purchased from various suppliers.

In some examples, the lignocellulosic composite can further comprise from 0% to 2% by weight of PF. In further examples, the lignocellulosic composite can further comprise from 0% to 0.5%, 0.5% to 1%, 1% to 1.5%, or 1.5% to 2.0% by weight of PF. In certain examples, the lignocellulosic composite can further comprise from 0% to 1%, 0% to 1.5%, or 0% to 2.0% by weight of PF. In specific examples, the lignocellulosic composite can further comprise from 0.5% to 1.5%, or 0.5% to 2.0% by weight of PF.

In some examples, the lignocellulosic composite can further comprise from 1.4% to 1.6% by weight of PF. In further examples, the lignocellulosic composite can further comprise from 1.4% to 1.45%, 1.45% to 1.5%, 1.5% to 1.55%, or 1.55% to 1.6% by weight of PF. In certain examples, the lignocellulosic composite further can comprise from 1.4% to 1.5%, 1.4% to 1.55%, or 1.4% to 1.6% by weight of PF.

In some examples, the phenyl formaldehyde is in powder form. In further examples, the phenyl formaldehyde is in liquid form.

pMDI:ESO

In some examples, the ratio of pMDI to ESO can be from 1:0 to 5:0. In further examples, the ratio of pMDI to ESO can be from 1.0:0 to 1.5:0, 1.5:0 to 2.0:0, 2.0:0 to 2.5:0, 2.5:0 to 3.0:0, 3.0:0 to 3.5:0, 3.5:0 to 4.0:0, 4.0:0 to 4.5:0, or 4.5:0 to 5.0:0. In certain examples, the ratio of pMDI to ESO can be from 1.0:0 to 2.0:0, 1.0:0 to 2.5:0, 1.0:0 to 3.0:0, 1.0:0 to 3.5:0, 1.0:0 to 4.0:0, 1.0:0 to 4.5:0, or 1.0:0 to 5.0:0. In specific examples, the ratio of pMDI to ESO can be from 2.7:0 to 2.8:0, 2.8:0 to 2.9:0, 2.9:0 to 3.0:0, 3.0:0 to 3.1:0, or 3.1:0 to 3.2:0. In some examples, the ratio of pMDI to ESO can be from 2.7:0 to 2.9:0, 2.7:0 to 3.0:0, 2.7:0 to 3.1:0, or 2.7:0 to 3.2:0. In further examples, the ratio of pMDI to ESO can be from 4.2:0 to 4.3:0, 4.3:0 to 4.4:0, 4.4:0 to 4.5:0, 4.5:0 to 4.6:0, or 4.6:0 to 4.7:0. In certain examples, the ratio of pMDI to ESO can be from 4.2:0 to 4.4:0, 4.2:0 to 4.5:0, 4.2:0 to 4.6:0, or 4.6:0 to 4.7:0. In specific examples, the ratio of pMDI to ESO can be from 2.0:0 to 2.1:0, 2.1:0 to 2.2:0, 2.2:0 to 2.3:0, 2.3:0 to 2.4:0, or 2.4:0 to 2.5:0. In some examples, the ratio of pMDI to ESO can be from 2.0:0 to 2.2:0, 2.0:0 to 2.3:0, 2.0:0 to 2.4:0, or 2.0:0 to 2.5:0.

In some examples, the ratio of pMDI to ESO can be from 1.2:1 to 2.2:1. In further examples, the ratio of pMDI to ESO can be from 1.2:1 to 1.3:1, 1.3:1 to 1.4:1, 1.4:1 to 1.5:1, 1.5:1 to 1.6; 1, or 1.6:1 to 1.7:1. In certain examples, the ratio of pMDI to ESO can be from 1.2:1 to 1.4:1, 1.2:1 to 1.5:1, 1.2:1 to 1.6; 1, or 1.2:1 to 1.7:1. In specific examples, the ratio of pMDI to ESO can be from 1.7:1 to 1.8:1, 1.8:1 to 1.9:1, 1.9:1 to 2.0:1, 2.0:1 to 2.1; 1, or 2.1:1 to 2.2:1. In certain examples, the ratio of pMDI to ESO can be from 1.7:1 to 1.9:1, 1.7:1 to 2.0:1, 1.7:1 to 2.1; 1, or 1.7:1 to 2.2:1.

In further examples, the ratio of pMDI to ESO can be from 1.5:1.5 to 2.5:1.5. In some examples, the ratio of pMDI to ESO can be from 1.5:1.5 to 1.6:1.5, 1.6:1.5 to 1.7:1.5, 1.7:1.5 to 1.8:1.5, 1.8:1.5 to 1.9:1.5, or 1.9:1.5 to 2.0:1.5. In further examples, the ratio of pMDI to ESO can be from 1.5:1.5 to 1.7:1.5, 1.5:1.5 to 1.8:1.5, 1.5:1.5 to 1.5:1.5, or 1.5:1.5 to 2.0:1.5. In certain examples, the ratio of pMDI to ESO can be from 2.0:1.5 to 2.1:1.5, 2.1:1.5 to 2.2:1.5, 2.2:1.5 to 2.3:1.5, 2.3:1.5 to 2.4:1.5, or 2.4:1.5 to 2.5:1.5. In specific examples, 2.0:1.5 to 2.2:1.5, 2.0:1.5 to 2.3:1.5, 2.0:1.5 to 2.4:1.5, or 2.0:1.5 to 2.5:1.5.

pMDI:Wax

In further examples, the ratio of pMDI to wax can be from 2.5:1.7 to 5.0:1.7. In some examples, the ratio of pMDI to wax can be from 2.5:1:7 to 3.0:1.7, 3.0:1.7 to 3.5:1.7, 3.5:1.7 to 4.0:1.7, 4.0:1.7 to 4.5:1.7, or 4.5:1.7 to 5.0:1.7. In further examples, the ratio of pMDI to wax can be from 2.5:1.7 to 3.5:1.7, 2.5:1.7 to 4.0:1.7, 2.5:1.7 to 4.5:1.7, or 2.5:1.7 to 5.0:1.7. In certain examples, the ratio of pMDI to wax can be from 2.7:1.7 to 2.8:1.7, 2.8:1.7 to 2.9:1.7, 2.9:1.7 to 3.0:1.7, 3.0:1.7 to 3.1:1.7, or 3.1:1.7 to 3.2:1.7. In specific examples, the ratio of pMDI to wax can be from 2.7:1.7 to 2.9:1.7, 2.7:1.7 to 3.0:1.7, 2.7:1.7 to 3.1:1.7, or 2.7:1.7 to 3.2:1.7. In some examples, the ratio of pMDI to wax can be from 3.5:1.7 to 3.6:1.7, 3.6:1.7 to 3.7:1.7, 3.7:1.7 to 3.8:1.7, 3.8:1.7 to 3.9:1.7, or 3.9:1.7 to 4.0:1.7. In further examples, the ratio of pMDI to wax can be from 3.5:1.7 to 3.7:1.7, 3.5:1.7 to 3.8:1.7, 3.5:1.7 to 3.9:1.7, or 3.5:1.7 to 4.0:1.7. In certain examples, the ratio of pMDI to wax can be from 4.2:1.7 to 4.3:1.7, 4.3:1.7 to 4.4:1.7, 4.4:1.7 to 4.5:1.7, 4.5:1.7 to 4.6:1.7, or 4.6:1.7 to 4.7:1.7. In specific examples, the ratio of pMDI to wax can be from 4.2:1.7 to 4.4:1.7, 4.2:1.7 to 4.5:1.7, 4.2:1.7 to 4.6:1.7, or 4.2:1.7 to 4.7:1.7.

In further examples, the ratio of pMDI to wax can be from 1.5:1.25 to 2.5:1.25. In some examples, the ratio of pMDI to wax is from 1.5:1.25 to 1.6:1.25, 1.6:1.25 to 1.7:1.25, 1.7:1.25 to 1.8:1.25, 1.8:1.25 to 1.9:1.25, or 1.9:1.25 to 2.0:1.25. In further examples, the ratio of pMDI to wax can be from 1.5:1.25 to 1.7:1.25, 1.5:1.25 to 1.8:1.25, 1.5:1.25 to 1.9:1.25, or 1.5:1.25 to 2.0:1.25. In certain examples, the ratio of pMDI to wax can be from 2.0:1.25 to 2.1:1.25, 2.1:1.25 to 2.2:1.25, 2.2:1.25 to 2.3:1.25, 2.3:1.25 to 2.4:1.25, or 2.4:1.25 to 2.5:1.25. In specific examples, the ratio of pMDI to wax can be from 2.0:1.25 to 2.2:1.25, 2.0:1.25 to 2.3:1.25, 2.0:1.25 to 2.4:1.25, or 2.0:1.25 to 2.5:1.25.

pMDI:PF

In some examples, the ratio of pMDI to PF can be from 2.5:1.5 to 5.0:1.5. In some examples, the ratio of pMDI to PF can be from 2.5:1:5 to 3.0:1.5, 3.0:1.5 to 3.5:1.5, 3.5:1.5 to 4.0:1.5, 4.0:1.5 to 4.5:1.5, or 4.5:1.5 to 5.0:1.5. In further examples, the ratio of pMDI to PF can be from 2.5:1.5 to 3.5:1.5, 2.5:1.5 to 4.0:1.5, 2.5:1.5 to 4.5:1.5, or 2.5:1.5 to 5.0:1.5. In certain examples, the ratio of pMDI to PF can be from 2.7:1.5 to 2.8:1.5, 2.8:1.5 to 2.9:1.5, 2.9:1.5 to 3.0:1.5, 3.0:1.5 to 3.1:1.5, or 3.1:1.5 to 3.2:1.5. In specific examples, the ratio of pMDI to PF can be from 2.7:1.5 to 2.9:1.5, 2.7:1.5 to 3.0:1.5, 2.7:1.5 to 3.1:1.5, or 2.7:1.5 to 3.2:1.5. In some examples, the ratio of pMDI to PF can be from 3.5:1.5 to 3.6:1.5, 3.6:1.5 to 3.7:1.5, 3.7:1.5 to 3.8:1.5, 3.8:1.5 to 3.9:1.5, or 3.9:1.5 to 4.0:1.5. In further examples, the ratio of pMDI to PF can be from 3.5:1.5 to 3.7:1.5, 3.5:1.5 to 3.8:1.5, 3.5:1.5 to 3.9:1.5, or 3.5:1.5 to 4.0:1.5. In certain examples, the ratio of pMDI to PF can be from 4.2:1.5 to 4.3:1.5, 4.3:1.5 to 4.4:1.5, 4.4:1.5 to 4.5:1.5, 4.5:1.5 to 4.6:1.5, or 4.6:1.5 to 4.7:1.5. In specific examples, the ratio of pMDI to PF can be from 4.2:1.5 to 4.4:1.5, 4.2:1.5 to 4.5:1.5, 4.2:1.5 to 4.6:1.5, or 4.2:1.5 to 4.7:1.5.

In some examples, the ratio of pMDI to PF can be from 1.5:0 to 5.0:0. In further examples, the ratio of pMDI to PF can be from 1.5:0 to 2.0:0, 2.0:0 to 2.5:0, 2.5:0 to 3.0:0, 3.0:0 to 3.5:0, 3.5:0 to 4.0:0, 4.0:0 to 4.5:0, or 4.5:0 to 5.0:0. In certain examples, the ratio of pMDI to PF can be from 1.5:0 to 2.5:0, 1.5:0 to 3.0:0, 1.5:0 to 3.5:0, 1.5:0 to 4.0:0, 1.5:0 to 4.5:0, or 1.5:0 to 5.0:0. In some examples, the ratio of pMDI to PF can be from 1.5:0 to 1.6:0, 1.6:0 to 1.7:0, 1.7:0 to 1.8:0, 1.8:0 to 1.9:0, or 1.9:0 to 2.0:0. In further examples, the ratio of pMDI to PF can be from 1.5:0 to 1.7:0, 1.5:0 to 1.8:0, 1.5:0 to 1.9:0, or 1.5:0 to 2.0:0. In certain examples, the ratio of pMDI to PF can be from 2.0:0 to 2.1:0, 2.1:0 to 2.2:0, 2.2:0 to 2.3:0, 2.3:0 to 2.4:0, or 2.4:0 to 2.5:0. In specific examples, the ratio of pMDI to PF can be from 2.0:0 to 2.2:0, 2.0:0 to 2.3:0, 2.0:0 to 2.4:0, or 2.0:0 to 2.5:0.

In some examples, the ratio of pMDI to PF can be from 2.5:1:7 to 3.0:0, 3.0:0 to 3.5:0, 3.5:0 to 4.0:0, 4.0:0 to 4.5:0, or 4.5:0 to 5.0:0. In further examples, the ratio of pMDI to PF can be from 2.5:0 to 3.5:0, 2.5:0 to 4.0:0, 2.5:0 to 4.5:0, or 2.5:0 to 5.0:0. In certain examples, the ratio of pMDI to PF can be from 2.7:0 to 2.8:0, 2.8:0 to 2.9:0, 2.9:0 to 3.0:0, 3.0:0 to 3.1:0, or 3.1:0 to 3.2:0. In specific examples, the ratio of pMDI to PF can be from 2.7:0 to 2.9:0, 2.7:0 to 3.0:0, 2.7:0 to 3.1:0, or 2.7:0 to 3.2:0. In some examples, the ratio of pMDI to PF can be from 3.5:0 to 3.6:0, 3.6:0 to 3.7:0, 3.7:0 to 3.8:0, 3.8:0 to 3.9:0, or 3.9:0 to 4.0:0. In further examples, the ratio of pMDI to PF can be from 3.5:0 to 3.7:0, 3.5:0 to 3.8:0, 3.5:0 to 3.9:0, or 3.5:0 to 4.0:0. In certain examples, the ratio of pMDI to PF can be from 4.2:0 to 4.3:0, 4.3:0 to 4.4:0, 4.4:0 to 4.5:0, 4.5:0 to 4.6:0, or 4.6:0 to 4.7:0. In specific examples, the ratio of pMDI to PF can be from 4.2:0 to 4.4:0, 4.2:0 to 4.5:0, 4.2:0 to 4.6:0, or 4.2:0 to 4.7:0.

pMDI, ESO, Wax, and PF

In specific examples, the lignocellulosic composite can comprise from 3% to 3.75% by weight of pMDI, 1.4% to 1.6% by weight of epoxidized soybean oil, 1.6% to 1.8% by weight of wax, and 1.4% to 1.6% by weight of powder PF.

pMDI, ESO, and Wax

In certain examples, the lignocellulosic composite can comprise from 3% to 3.75% by weight of pMDI, 1.4% to 1.6% by weight of epoxidized soybean oil, and 1.6% to 1.8% by weight of wax.

In some examples, the lignocellulosic composite can comprise 1.5% to 2.5% by weight of pMDI, 1.4% to 1.6% by weight of epoxidized soybean oil, and 1.2% to 1.3% by weight of wax.

Method of Making a Lignocellulosic Composite

Also disclosed herein is a method of making a lignocellulosic composite, comprising combining an epoxidized plant-based oil, a lignocellulosic material, and an isocyanate resin. In some examples, the epoxidized plant-based oil, lignocellulosic material, and isocyanate resin are combined sequentially in any order. In further examples, the lignocellulosic material is combined with a mixture of the epoxidized plant-based oil and the isocyanate resin. In certain examples, the epoxidized plant-based oil, lignocellulosic material, and isocyanate resin are combined simultaneously.

In the disclosed methods, and compositions prepared by them, the epoxidized plant-based oil permits the amount of isocyanate resin to be reduced from what otherwise would have been used without the epoxidized plant-based oil, without a significant negative impact on the method or resulting composite. Thus, the existing methods and equipment for forming lignocellulosic composites with isocyanate resins alone need not be modified significantly to accommodate the addition of epoxidized plate-based oils. The amount of epoxidized plant-based oils can be used to replace an equivalent amount or a partially equivalent amount of isocyanate resin that otherwise would have been used without the epoxidized plant-based oil. Thus, the disclosed methods contemplate even the use of a very small amount of epoxidized plant-based oils as that permits the reduction of a some of the isocyanate resin that would have been used.

In certain examples, the lignocellulosic composite is heated at a temperature of from 300° C. to 500° C. In some examples, the lignocellulosic composite is heated at a temperature of from 300° C. to 400° C. or 450° C. to 500° C. In further examples, the lignocellulosic composite is heated at a temperature of from 300° C. to 350° C., 350° C. to 400° C., 400° C. to 450° C., or 450° C. to 500° C. In certain examples, the lignocellulosic composite is heated at a temperature of from 300° C. to 325° C., 325° C. to 350° C., 350° C. to 375° C., 375° C. to 400° C., 400° C. to 425° C., 425° C. to 450° C., 450° C. to 475° C., or 475° C. to 500° C.

In specific examples, the lignocellulosic composite is heated for from 1 minute to 5 minutes. In some examples, the lignocellulosic composite is heated for from 1 minute to 2 minutes, 2 minutes to 3 minutes, 3 minutes to 4 minutes, or 4 minutes to 5 minutes. In further examples, the lignocellulosic composite is heated for from 1 minute to 3 minutes, 1 minute to 4 minutes, or 1 minute to 5 minutes.

In some examples, the lignocellulosic composite is compressed at a pressure of from 100 to 1000 $lb_f/in.^2$ (psi). In further examples, the lignocellulosic composite is compressed at a pressure of from 100 to 500 psi or 500 psi to 1000 psi. In certain examples, the lignocellulosic composite is compress at a pressure of from 100 to 250 psi, 250 to 500 psi, 500 to 750 psi, for 750 to 1000 psi. In specific examples, the lignocellulosic composite is compressed at a pressure of from 100 to 200 psi, 200 to 300 psi, 300 to 400 psi, 400 to 500 psi, 500 to 600 psi, 600 to 700 psi, 700 to 800 psi, 800 to 900 psi, or 900 psi to 1000 psi. In some examples, the lignocellulosic composite is compressed at a pressure of from 100 to 300 psi, 100 to 400 psi, 100 to 500 psi, 100 to 600 psi, 100 to 700 psi, 100 to 800 psi, or 100 to 900 psi.

In some examples, the epoxidized plant-based oil comprises an epoxidized soybean oil. In further examples, the epoxidized plant-based oil comprises an epoxidized linseed oil.

In specific examples, the lignocellulosic composite comprises from 1% to 10% by weight of epoxidized soybean oil.

In some examples, the ratio of isocyanate resin to epoxidized plant-based oil is from 4:1 to 2:1.

In some examples, the lignocellulosic composite is an oriented strand board ("OSB"), waferboard, particle board, medium-density fiberboard, plywood, agfiber boards, strands and ply veneer composites, and agfiber and strand composites.

In further examples, the isocyanate resin comprises methylenebis(phenyl isocyanate) (MDI), polymeric methylene diphenyl diisocyanate (pMDI), ethylenebis(phenyl isocyanate) (EDI), toluene diisocyanate (TDI), hexamethylene diisocyanate (HDI), naphthalene diisocyanate (NDI), methylene bis-cyclohexylisocyante (HMDI; hydrogenated MDI, isophorone diisocyanate (IPDI), or any combination thereof.

In specific examples, the isocyanate resin comprises polymeric methylene diphenyl diisocyanate (pMDI).

In specific examples, the lignocellulosic composite can comprise from 1.5% to 2.5% by weight of pMDI.

In some examples, the lignocellulosic composite further comprises wax.

In further examples, the lignocellulosic composite further comprises phenyl formaldehyde. In some examples, the phenyl formaldehyde is a powder. In further examples, the phenyl formaldehyde is a liquid.

In certain examples, the lignocellulosic composite can comprise from 1.5% to 2.5% by weight of pMDI, 1.4% to 1.6% by weight of epoxidized soybean oil, and 1.2% to 1.3% by weight of wax.

In specific examples, the lignocellulosic composite can comprise from 3% to 3.75% by weight of pMDI, 1.4% to 1.6% by weight of epoxidized soybean oil, and 1.6% to 1.8% by weight of wax.

In further examples, the lignocellulosic composite can comprise from 3% to 3.75% by weight of pMDI, 1.4% to 1.6% by weight of epoxidized soybean oil, 1.6% to 1.8% by weight of wax, and 1.4% to 1.6% by weight of powder PF.

Lignocellulosic Article

Further provided herein is a lignocellulosic article comprising the lignocellulosic composite as disclosed herein. In some examples, the lignocellulosic article is a building structure, wherein the building structure can include but is not limited to the articles, materials, or supplies incorporated into a construction project or work, such as a building.

In certain examples, the building structure is subflooring or sheathing. In further examples, sheathing can include but is not limited to roof sheathing, wall sheathing, or insulated sheathing.

A number of embodiments of the disclosure have been described. Nevertheless, it will be understood that various modifications may be made without departing from the spirit and scope of the invention. Accordingly, other embodiments are within the scope of the following claims.

By way of non-limiting illustration, examples of certain embodiments of the present disclosure are given below.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention, which are apparent to one skilled in the art.

Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

Figure 9:
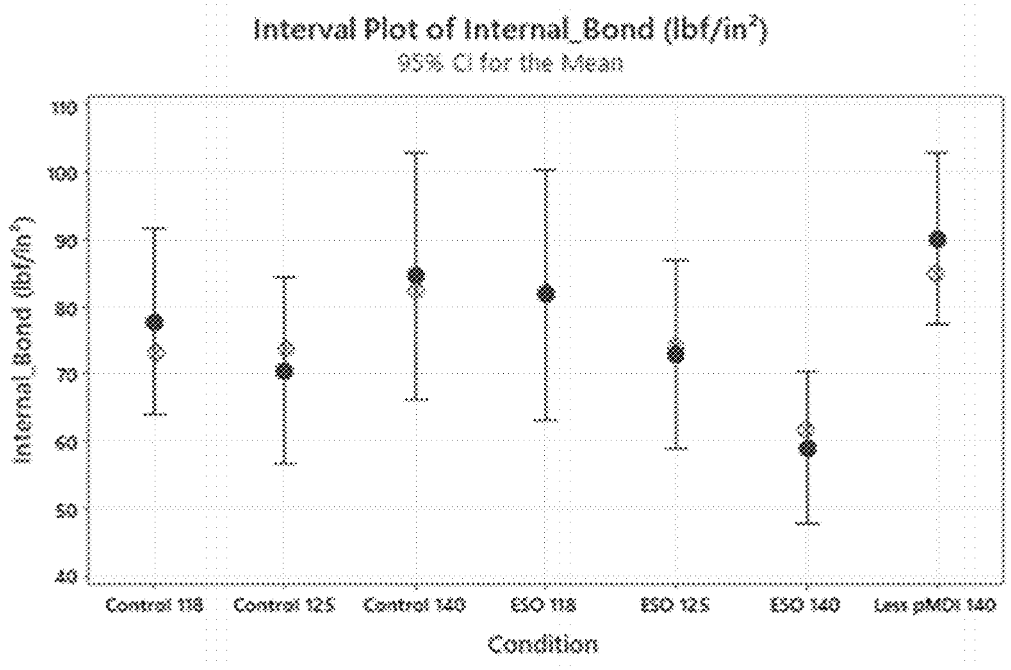
FIG. 9 is a graph of internal bond ($lb_f/in^2$) of sample lignocellulosic composites.
Figure 10:
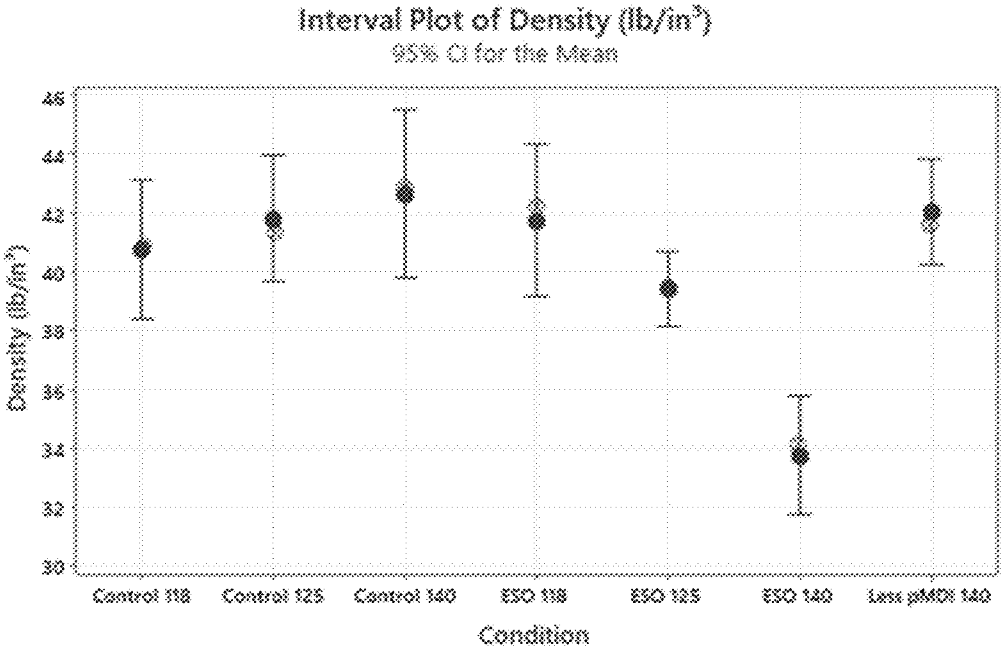
FIG. 10 is a graph of density of sample lignocellulosic composites for internal bond calculations.

For the examples below, the internal bond and density of the samples used were tested so as to ensure that samples that were directly compared had appropriate density and internal bonding. The results of these tests are shown in FIGS. 9 and 10. Internal bond is related to density. As tested herein, a decrease in density is appropriate when there is a corresponding decrease in internal bonding. For examples, two samples with different densities can be used for a direct comparison when the internal bonding of the lower density sample is correspondingly decreased, but if the density of two samples is the same and the internal bonding of one sample is decreased, the bonding is not sufficient for a direct comparison.

Example 1: Water Properties

Recipe 1

Edge swell and thickness swell were tested in lignocellulosic composites comprising a mixture of pMDI and ESO in accordance with the formulations of Table 1. Edge swell testing was performed according to ASTM D1037-12 (2020), wherein the samples (6"×6") were submerged horizontally under 1 in. of water maintained at a temperature of 68±2° F. (20±1° C.). After 24 hours, samples were left to drain for 10 minutes to remove the excess surface water and immediately the samples were weighed, and thickness was measured at the edge of the sample and 1" in from the edge of the sample. Initial edge and 1" thickness were compared with resulting edge and 1" thickness after water soaking.

The control sample was an OSB panel comprising wood, pMDI, wax and powder phenyl formaldehyde made via an OSB manufacturing process. The panels comprising ESO and a reduced percentage composition of pMDI were made using the same methods as the control except the indicated percentage of pMDI was replaced with ESO prior to mixing the pMDI with wood to create the OSB panel that was subsequently pressed. The 33% pMDI reduction sample was made by reducing by 33% the amount of the pMDI in the control formulation and pressing the components to form the OSB panel sample. For each condition, as provided in Table 1, two boards were pressed and 10 samples from each board were cut and used to test water properties. The ESO and pMDI mixtures had compositions as disclosed in Table 1. The results of the edge swell testing are disclosed in FIG. 2A. The results of the thickness swell testing are disclosed in FIG. 2B.

TABLE 1

Compositions of pMDI and ESO mixtures used for lignocellulosic composites that underwent property testing.

| Condition | pMDI loading (%) | ESO loading (%) | Wax loading (%) | Powder PF (%) |
|---|---|---|---|---|
| Control | 4.5 | 0 | 1.7 | 1.5 |
| ESO with 17% pMDI reduction | 3.75 | 1.5 | 1.7 | 1.5 |
| ESO with 33% pMDI reduction | 3.0 | 1.5 | 1.7 | 1.5 |
| 33% pMDI reduction | 3.0 | 0 | 1.7 | 1.5 |

TABLE 2

Figure 2A:
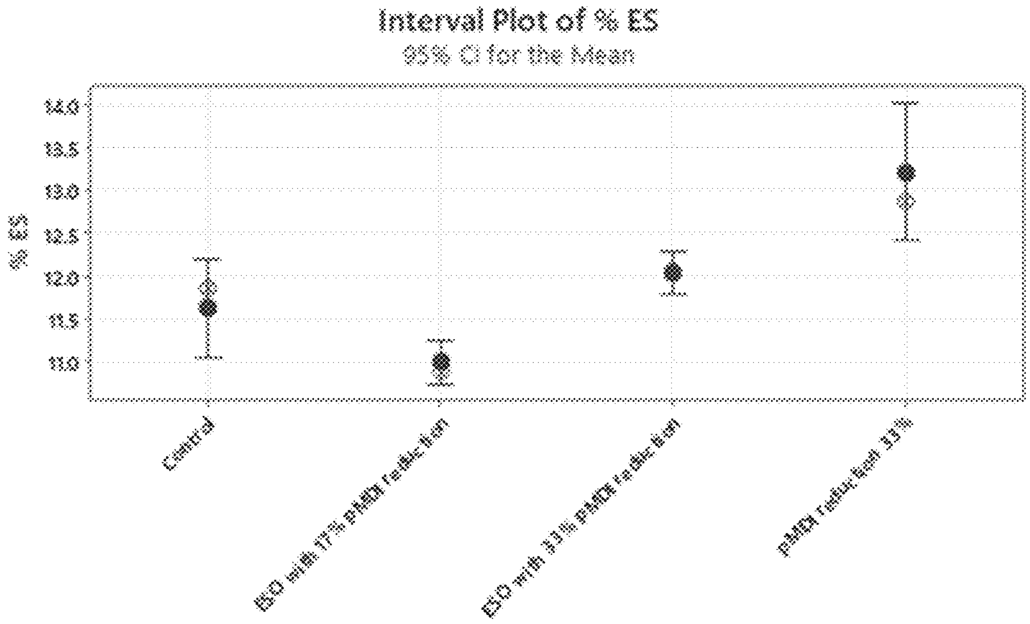
FIGS. 2A-2B are interval plots of the edge swell percent (FIG. 2A) and thickness swell percent (FIG. 2B) of sample lignocellulosic composites made in accordance with the formulations of Table 1.
Figure 2B:
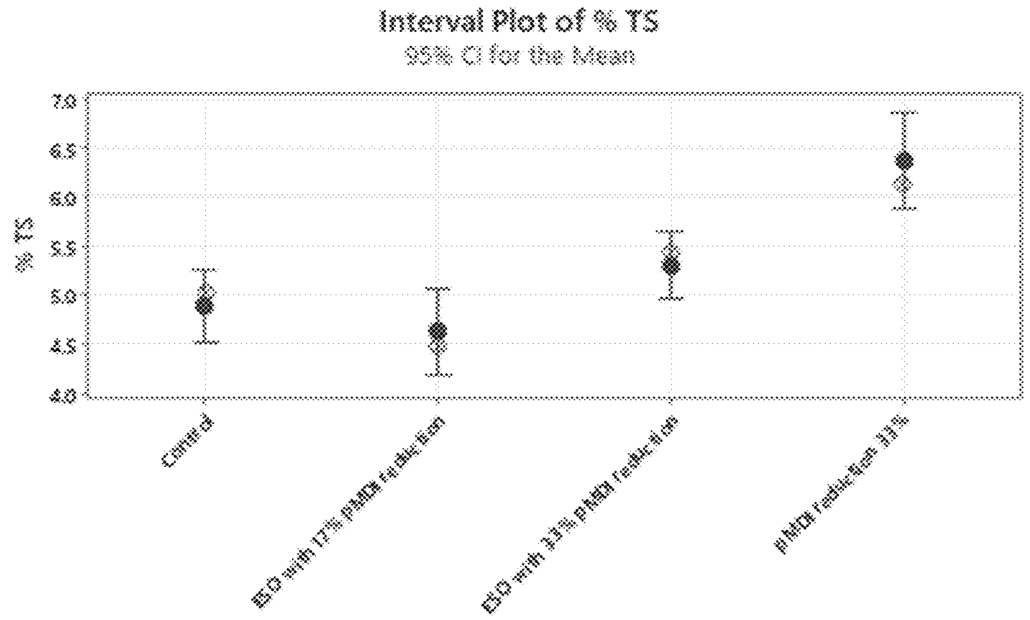

Edge swell percentages and thickness swell percentages of FIGS. 2A and 2B.

| | Control | ESO with 17% pMDI reduction | ESO with 33% pMDI reduction | pMDI reduction 33% |
|---|---|---|---|---|
| % Edge Swell | 11.6 | 11.0 | 12.0 | 13.2 |
| % Thickness Swell | 4.9 | 4.6 | 5.3 | 6.4 |

FIGS. 2A and 2B show the edge swell percent and thickness swell percent of lignocellulosic composites made in accordance with the formulations of Table 1. These results show that when the pMDI content was decreased and a portion of it replaced with an ESO, edge and thickness swell remained relatively unchanged. Thus, demonstrating that the resulting composition performed as well as the control with respect to water absorption properties.

After Cyclic Testing

Edge swell and thickness swell were tested in lignocellulosic composites comprising a mixture of pMDI and ESO in accordance with the formulations of Table 1. The edge and thickness swell measurements were conducted after 24 hours of cyclic testing and residual swell was measured after continued cyclic testing. In cyclic testing, the samples (6"×6") were submerged horizontally under 1 in. of water maintained at a temperature of 68±2° F. (20±1° C.). After 24 hours samples were left to drain for 10 minutes to remove the excess surface water and immediately samples were weighed, and thickness was measured, thereby resulting in edge and thickness swell data of FIGS. 3A and 3B. Initial edge and 1" thickness is compared with the resulting edge and 1" thickness after water soaking.

This is followed by drying in oven at 70° C. for 24 hours. Samples are cooled to room temperature and soaked in water for another 24 hours followed by drying in oven. Cycle is repeated 3 times. Initial edge and 1" thickness is measure and compared with final edge and 1" thickness after cyclic testing to report residual edge and thickness swell.

Figure 3A:
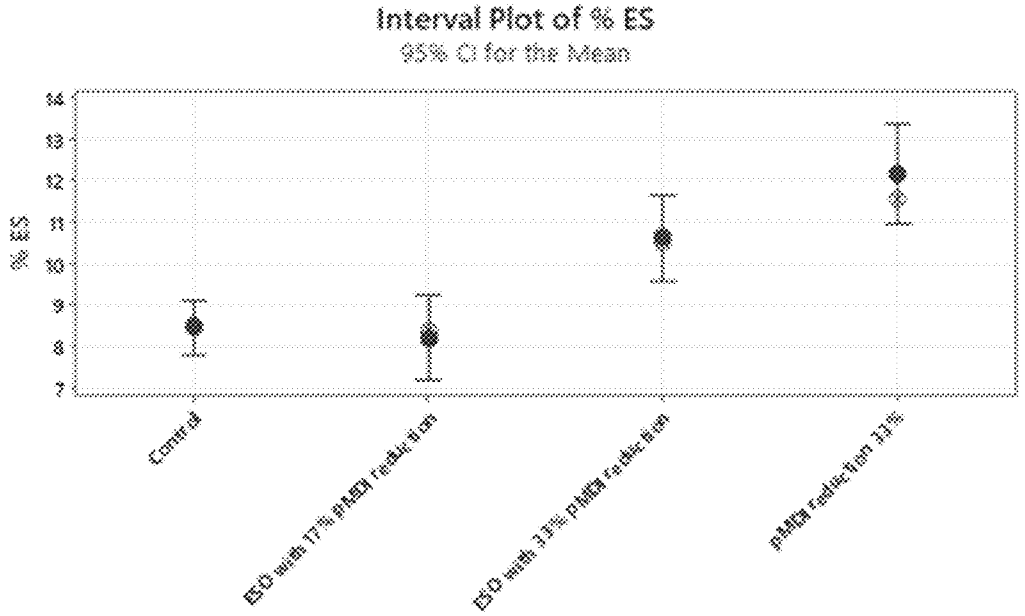
FIGS. 3A-3B are interval plots of the edge swell percent (FIG. 3A) and thickness swell percent (FIG. 3B) of sample lignocellulosic composites after cyclic testing.
Figure 3B:
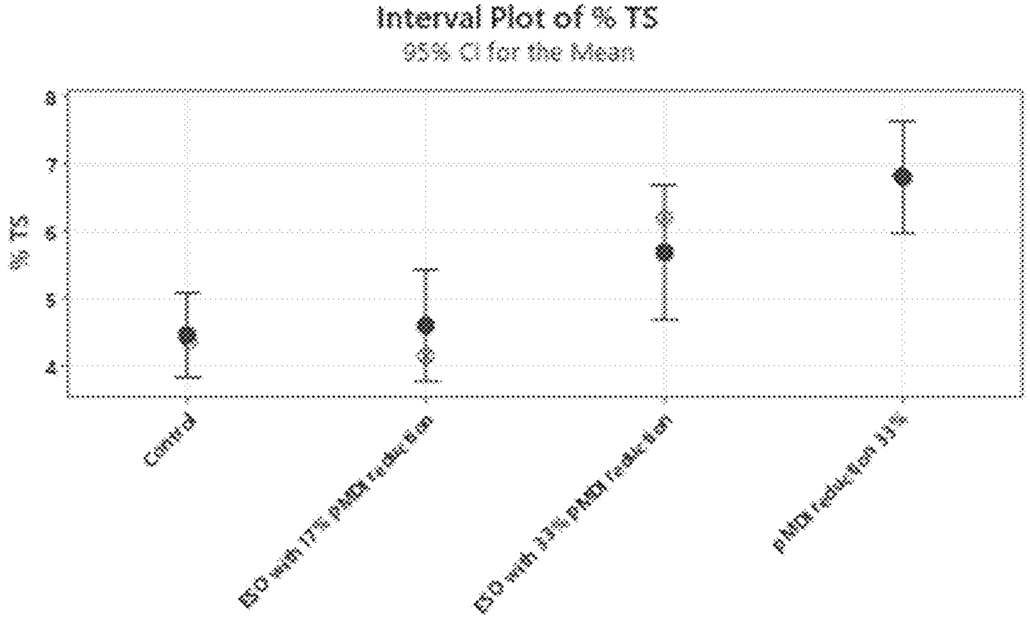

FIGS. 3A and 3B show the edge swell percent and thickness swell percent of lignocellulosic composites made in accordance with the formulations of Table 1 and after cyclic testing. These results, as shown in Table 3, show that when the pMDI content was decreased and a portion of it replaced with an ESO, edge and thickness swell remained relatively unchanged. Thus, demonstrating that the resulting composition performed as well as the control with respect to water absorption properties.

TABLE 3

Edge swell percentages and thickness swell percentages of FIGS. 3A and 3B.

| | Control | ESO with 17% pMDI reduction | ESO with 33% pMDI reduction | pMDI reduction 33% |
|---|---|---|---|---|
| % Edge Swell | 8.5 | 8.2 | 10.7 | 12 |
| % Thickness Swell | 4.5 | 4.6 | 5.7 | 6.9 |

Without Powder PF

Edge swell and thickness swell were tested in lignocellulosic composites comprising a mixture of pMDI and ESO, without powder PF, in accordance with the formulations of Table 4. The results of the edge swell testing are disclosed in FIG. 4A. The results of the thickness swell testing are disclosed in FIG. 4B.

TABLE 4

Compositions of pMDI and ESO mixtures used for lignocellulosic composites without powder PF that underwent water property testing.

| Condition | pMDI loading (%) | ESO loading (%) | Wax loading (%) | Powder PF (%) |
|---|---|---|---|---|
| Control | 4.5 | 0 | 1.7 | 0 |
| ESO with 17% pMDI reduction | 3.75 | 1.5 | 1.7 | 0 |
| ESO with 33% pMDI reduction | 3.0 | 1.5 | 1.7 | 0 |
| 33% pMDI reduction | 3.0 | 0 | 1.7 | 0 |

Figure 4A:
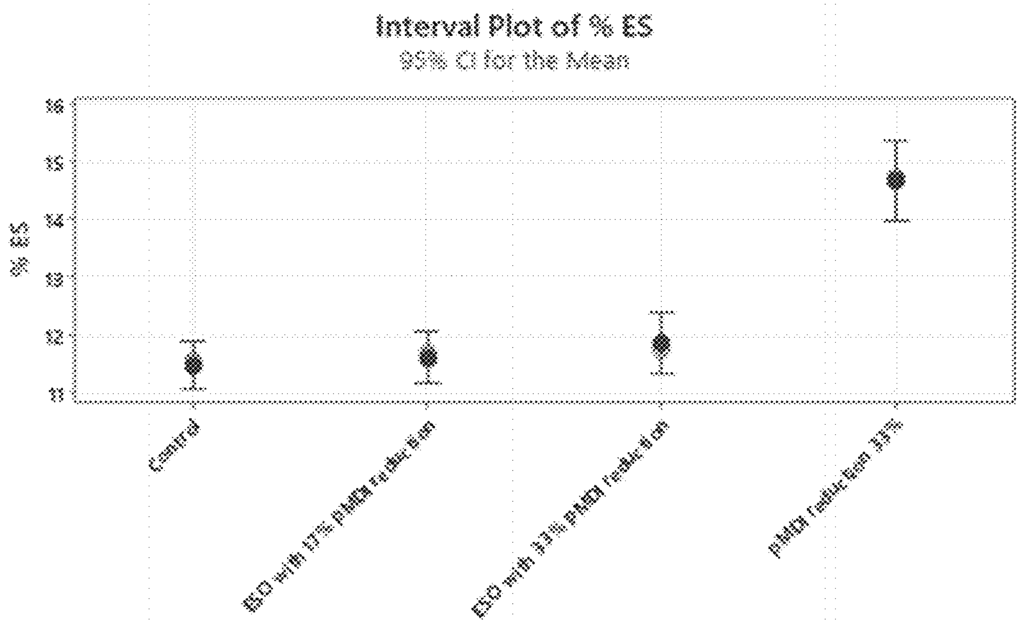
FIGS. 4A-4B are interval plots of the edge swell percent (FIG. 4A) and thickness swell percent (FIG. 4B) of sample lignocellulosic composites made in accordance with the formulations of Table 4 without phenol formaldehyde (PF) resin.
Figure 4B:
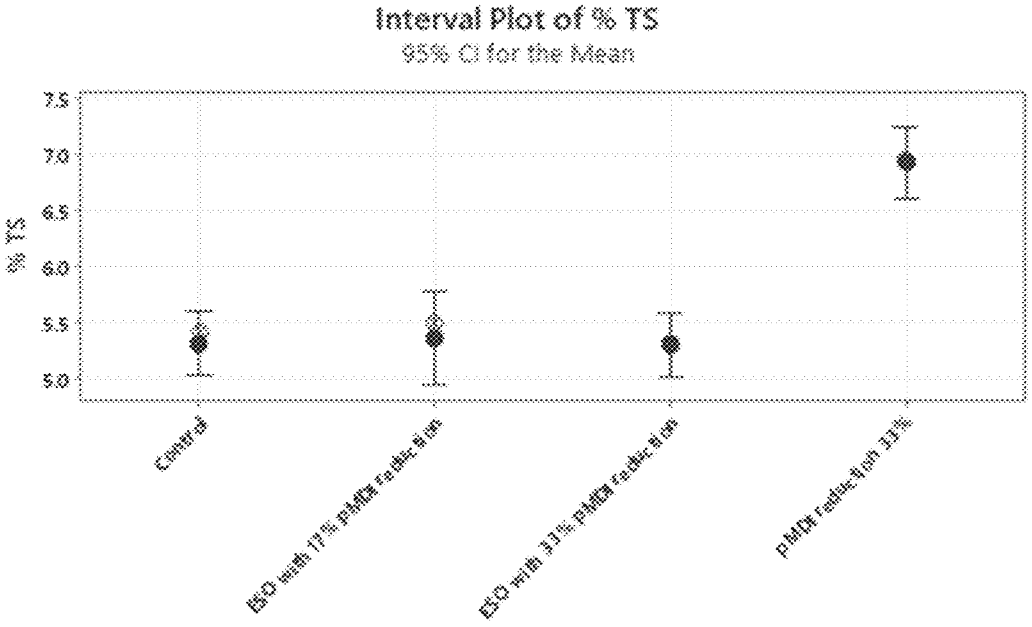

FIGS. 4A-4B show edge swell percent and thickness swell percent of sample lignocellulosic composites made in accordance with the formulations of Table 4, specifically, they do not include phenol formaldehyde (PF) resin. These results show that, even in the absence of the PF resin, when the pMDI content was decreased and a portion of it replaced with an ESO, the edge and swell thickness remained relatively unchanged. Thus, demonstrating that the resulting composition performed as well as the control with respect to water absorption.

Recipe 2

Edge swell and thickness swell were tested in lignocellulosic composites comprising a mixture of pMDI and ESO in accordance with the formulations of Table 5. The ESO and pMDI mixtures had compositions as disclosed in Table 5. The results of the edge swell testing are disclosed in FIG. 5A. The results of the thickness swell testing are disclosed in FIG. 5B.

TABLE 5

Compositions of pMDI and ESO mixtures used for lignocellulosic composites that underwent property

| Condition | pMDI loading (%) | ESO loading (%) | Wax loading (%) | Powder PF (%) |
|---|---|---|---|---|
| Control | 2.2 | 0 | 1.25 | 0 |
| Control with added ESO | 2.2 | 1.5 | 1.25 | 0 |
| ESO with 33% pMDI reduction | 1.76 | 1.5 | 1.25 | 0 |

Figure 5A:
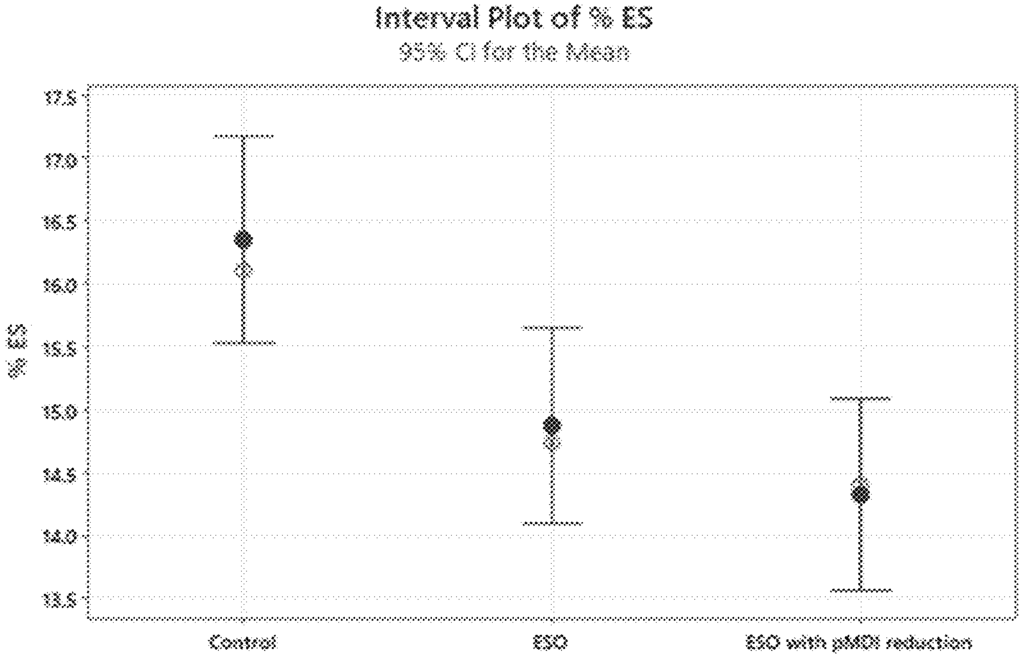
FIGS. 5A-5B are interval plots of the edge swell percent (FIG. 5A) and thickness swell percent (FIG. 5B) of sample lignocellulosic composites made in accordance with the formulations of Table 5.
Figure 5B:
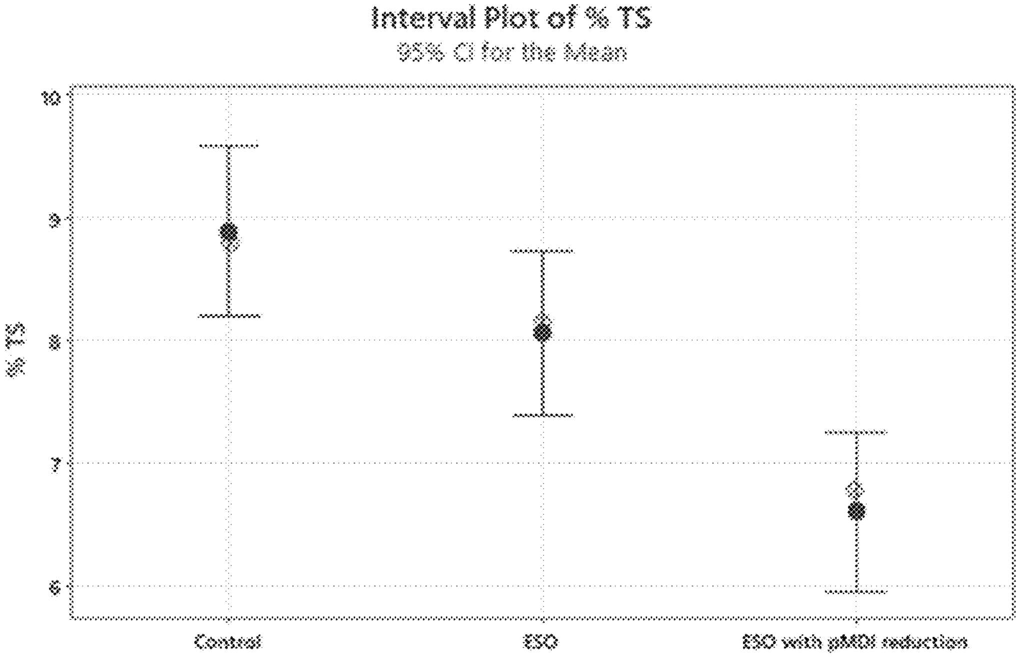

FIGS. 5A-5B show edge swell percent and thickness swell percent of sample lignocellulosic composites made in accordance with the formulations of Table 5, specifically, the lignocellulosic composites did not include powder PF resin. The results show that when the pMDI content was decreased and a portion replaced by ESO, the edge and thickness swelling percentages improved. Thus, demonstrating that the resulting composition performed as well as, if not better than, the control with respect to water absorption.

Example 2: Viscosity Study

Figure 6:
FIG. 6 is a photograph of example samples of a mixture of pMDI and ESO with no phase separation post-freezing at −18° C.

Viscosity was measured to compare that of a sample of adhesive with pMDI and no ESO and a sample of adhesive with pMDI and ESO. The viscosity study was performed so as to emulate winter conditions. Individual samples were left at −18° C. for 24 hours. All of the samples froze and upon thawing, no phase separation was observed, as shown in FIG. 6, wherein (from left to right) bottle 1 contains pMDI, bottle 2 contains the 25% ESO and 75% pMDI mixture, and bottle 3 contains the 50% ESO and 50% pMDI mixture. The resulting viscosities are below in Table 6. A single viscosity was performed on each individual sample. Viscosity measurements were performed using a Brookfield Ametek DVE Viscometer using Spindle S62 at 25° C.±0.5° C. The values in Table 6 show only a slight increase in viscosity when ESO is added to pMDI, thereby demonstrating that the boards with ESO perform as well in winter conditions as the boards without ESO.

TABLE 6

Viscosity measurements at room temperature (RT) and 3-4° C. for pMDI and ESO mixtures used to prepare lignocellulosic composites.

| Sample | Viscosity at RT | Viscosity at 3-4° C. |
|---|---|---|
| pMDI | 185 cP | 1350 cP |
| 25% ESO 75% pMDI | 255 cP | 1310 cP |
| 50% ESO 50% pMDI | 326 cP | 1820 cP |

Example 3: Press Time Study

A Press Time Study was conducted to determine the effect of changes in press time of OSB on curing of MDI when mixed with ESO. The compositions of the lignocellulosic composites tested are disclosed in Table 7, along with the resulting effect after a specific duration of differing press times. FIGS. 11 to 13 show edge swell, thickness swell, and water absorption at reduced press times with and without ESO.

Figure 7:
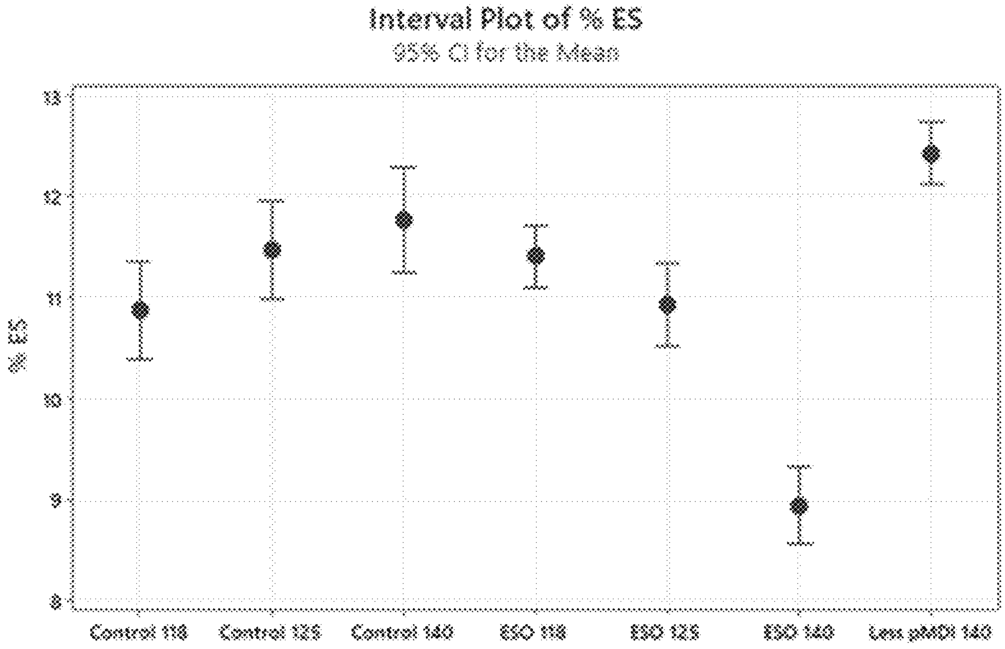
FIG. 7 is a graph of edge swell after 24 hours for sample lignocellulosic composites.
Figure 8:
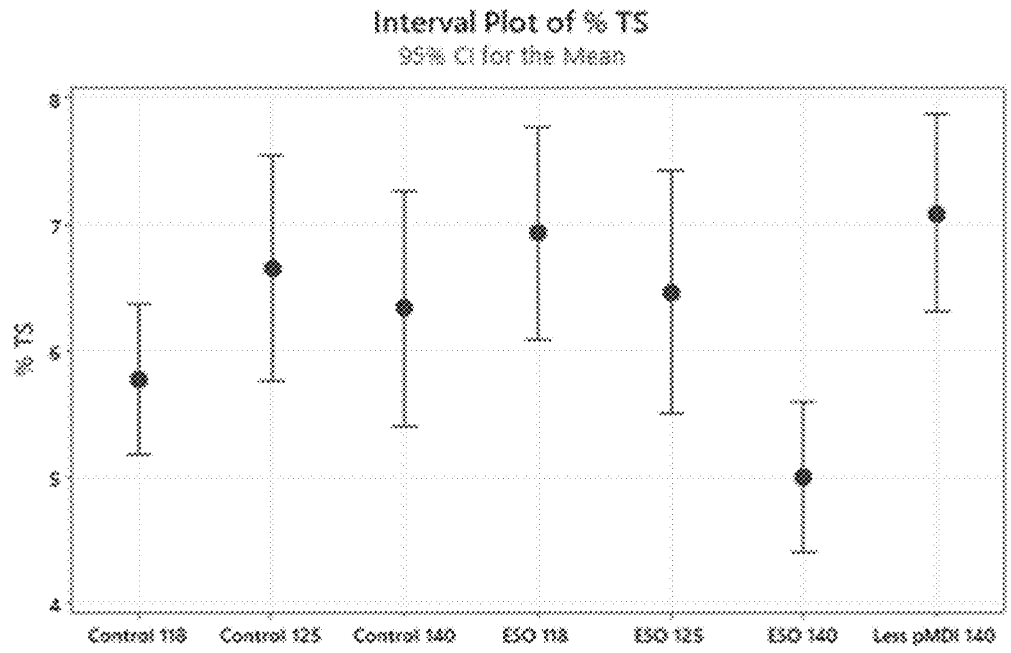
FIG. 8 is a graph of thickness swell after 24 hours for sample lignocellulosic composites.

The goal of this example was to determine whether panels with ESO failed more quickly than the control at reduced press times due to issues in the curing process. By reducing press time, there was less time for the isocyanate resin to react. As demonstrated in Table 7 below and FIGS. 11 to 13, there was no failure of the ESO board at low press times. The edge swell (FIG. 7) and thickness swell (FIG. 8) of the boards with ESO were comparable or improved when compared to the control boards. This showed that the addition of ESO did not impact the curing process and that if the process for manufacturing the panels is performed more quickly (e.g., reduced press time) or at a lower temperature, the boards with ESO will still have the required functional properties.

TABLE 7

Results of press time study conducted on lignocellulosic composites made with mixtures of varying compositions of ESO and pMDI.

| Condition | pMDI loading (%) | ESO loading (%) | Wax loading (%) | Powder PF (%) |
|---|---|---|---|---|
| Control | 4.5 | 0 | 1.7 | 1.5 |
| ESO with 17% pMDI reduction | 3.75 | 1.5 | 1.7 | 1.5 |
| 17% pMDI reduction, with no ESO | 3.75 | 0 | 1.7 | 1.5 |

TABLE 7-continued

Results of press time study conducted on lignocellulosic composites made with mixtures of varying compositions of ESO and pMDI.

| Condition | pMDI loading (%) | ESO loading (%) | Wax loading (%) | Powder PF (%) |
|---|---|---|---|---|
| | Press time (seconds) | | | |
| Condition | 140 | 125 | 118 | 110 |
| Control | Tested | Tested | Tested | Delamination |
| ESO with 17% pMDI reduction | Tested | Tested | Tested | NA |
| 17% pMDI reduction, with no ESO | Tested | Delamination | Delamination | NA |

Other advantages which are obvious, and which are inherent to the invention, will be evident to one skilled in the art. It will be understood that certain features and sub-combinations are of utility and may be employed without reference to other features and sub-combinations. This is contemplated by and is within the scope of the claims.

The methods and compositions of the appended claims are not limited in scope by the specific methods and compositions described herein, which are intended as illustrations of a few aspects of the claims and any methods and compositions that are functionally equivalent are intended to fall within the scope of the claims. Various modifications of the methods and compositions in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed is:

1. A lignocellulosic composite comprising an epoxidized plant-based oil, a lignocellulosic material, and an isocyanate resin, wherein a ratio by weight of the isocyanate resin to the epoxidized plant-based oil is from 1.5:1.5 to 2.5:1.5.

2. The lignocellulosic composite of claim 1, wherein the epoxidized plant-based oil comprises one or more selected from the group consisting of an epoxidized soybean oil and epoxidized linseed oil.

3. The lignocellulosic composite of claim 1, wherein the lignocellulosic composite is an oriented strand board ("OSB"), waferboard, particle board, medium-density fiberboard, plywood, agfiber board, strands and ply veneer composite, or agfiber and strand composite.

4. The lignocellulosic composite of claim 1, wherein the isocyanate resin comprises one or more selected from the group consisting of methylenebis(phenyl isocyanate) (MDI), polymeric methylene diphenyl diisocyanate (pMDI), ethylenebis(phenyl isocyanate) (EDI), toluene diisocyanate (TDI), hexamethylene diisocyanate (HDI), naphthalene diisocyanate (NDI), methylene bis-cyclohexylisocyante (HMDI; hydrogenated MDI), and isophorone diisocyanate (IPDI), or any combination thereof.

5. The lignocellulosic composite of claim 4, wherein the lignocellulosic composite comprises from 1.5% to 2.5% by weight of pMDI.

6. The lignocellulosic composite of claim 2, wherein the lignocellulosic composite comprises from greater than 0% to 50% by weight of epoxidized soybean oil.

7. The lignocellulosic composite of claim 1, further comprising wax, phenyl formaldehyde (PF), or any combination thereof.

8. The lignocellulosic composite of claim 1, wherein the lignocellulosic composite comprises from 1.5% to 2.5% by weight of pMDI, 1.4% to 1.6% by weight of epoxidized soybean oil, and 1.2% to 1.3% by weight of wax.

9. A method of making a lignocellulosic composite, comprising combining an epoxidized plant-based oil, a lignocellulosic material, and an isocyanate resin to form the lignocellulosic composite, wherein the ratio by weight of the isocyanate resin to the epoxidized plant-based oil is from 1.5:1.5 to 2.5:1.5.

10. The method of claim 9, wherein the epoxidized plant-based oil, lignocellulosic material, and the isocyanate resin are combined simultaneously.

11. The method of claim 9, further comprising heating the mixture at a temperature of from 300° C. to 500° C. for from 1 minute to 5 minutes.

12. The method of claim 9, further comprising compressing the mixture at a pressure of from 100 to 1000 lb/in$^2$.

13. The method of claim 9, wherein the epoxidized plant-based oil comprises one or more selected from the group consisting of an epoxidized soybean oil and an epoxidized linseed oil.

14. The method of claim 13, wherein the lignocellulosic composite comprises from greater than 0% to 50% by weight of epoxidized soybean oil.

15. The method of claim 9, wherein the lignocellulosic composite is an oriented strand board ("OSB"), waferboard, particle board, medium-density fiberboard, plywood, agfiber board, strands and ply veneer composite, or agfiber and strand composite.

16. The method of claim 9, wherein the isocyanate resin comprises one or more selected from the group consisting of methylenebis(phenyl isocyanate) (MDI), polymeric methylene diphenyl diisocyanate (pMDI), ethylenebis(phenyl isocyanate) (EDI), toluene diisocyanate (TDI), hexamethylene diisocyanate (HDI), naphthalene diisocyanate (NDI), methylene bis-cyclohexylisocyante (HMDI; hydrogenated MDI), and isophorone diisocyanate (IPDI).

17. The method of claim 16, wherein the lignocellulosic composite comprises from 1.5% to 2.5% by weight of pMDI.

18. The method of claim 9, wherein the lignocellulosic composite further comprises wax, phenyl formaldehyde (PF), or any combination thereof.

19. The method of claim 9, wherein the lignocellulosic composite comprises from 1.5% to 2.5% by weight of pMDI, 1.4% to 1.6% by weight of epoxidized soybean oil, and 1.2% to 1.3% by weight of wax.

20. A lignocellulosic article comprising the lignocellulosic composite of claim 1.

21. The lignocellulosic article of claim 20, wherein the lignocellulosic article is a building structure.

22. The lignocellulosic article of claim 21, wherein the building structure is subflooring or sheathing, further wherein sheathing comprises roof sheathing, wall sheathing, insulated sheathing, or any combination thereof.

* * * * *